United States Patent [19]

Swantee

[11] 4,293,138
[45] Oct. 6, 1981

[54] SEALING DEVICE

[75] Inventor: Klaus B. M. Swantee, Mt. Eemnes, Netherlands

[73] Assignee: Pidou B.V., Mt. Eemnes, Netherlands

[21] Appl. No.: 74,322

[22] Filed: Sep. 11, 1979

[30] Foreign Application Priority Data

Sep. 12, 1978 [NL] Netherlands .......................... 7809260

[51] Int. Cl.³ ........................ F16J 15/10; F16L 17/02
[52] U.S. Cl. ................................ 277/207 A; 277/192; 277/209; 285/110; 285/231; 285/345; 285/DIG. 11
[58] Field of Search ........... 277/207 A, 207 B, 207 R, 277/197, 208–211; 285/110, 230, 231, 345, DIG. 11

[56] References Cited

U.S. PATENT DOCUMENTS

| 2,032,492 | 3/1936 | Nathan | 277/207 A |
| 2,271,777 | 2/1942 | Nathan | 277/207 A |
| 2,616,504 | 11/1952 | Osmun | 277/208 X |
| 3,046,028 | 7/1962 | Nathan | 277/207 A |
| 3,048,415 | 8/1962 | Shook | 277/207 A |
| 3,498,623 | 3/1970 | Rowe | 277/207 A |
| 3,913,928 | 10/1975 | Yamaguchi | 277/207 A |

FOREIGN PATENT DOCUMENTS

| 770502 | 10/1967 | Canada | 277/207 A |
| 2001035 | 7/1970 | Fed. Rep. of Germany | 277/209 |
| 1201761 | 7/1959 | France | 285/341 |
| 61978 | 1/1940 | Norway | 277/207 A |
| 247518 | 12/1947 | Switzerland | 277/207 A |
| 150255 | 9/1920 | United Kingdom | 277/207 R |
| 1083451 | 9/1967 | United Kingdom | 285/110 |
| 1350593 | 4/1974 | United Kingdom | 277/207 A |

Primary Examiner—Robert S. Ward, Jr.
Attorney, Agent, or Firm—Becker & Becker, Inc.

[57] ABSTRACT

A sealing device for sealingly connecting two coaxial conduits and the like of a conduit arrangement including a first conduit and a second conduit, wherein the second conduit is disposed a predetermined distance in the first conduit to provide between them an annular space adapted to receive the sealing device. The sealing device includes first projections and second projections, respectively, on the outer diameter and on the inner diameter whereby the projections on the inner diameter and the projections on the outer diameter are arranged at least in part in a common radial section of predetermined axial length. The outer diameter of the outer projections is greater than the inner diameter of the conduit having the greater inner diameter and the inner diameter of the projections arranged on the inner diameter of the sealing device are at most equal to or at least nearly equal to the outer diameter of the conduit having the smaller outer diameter.

6 Claims, 2 Drawing Figures

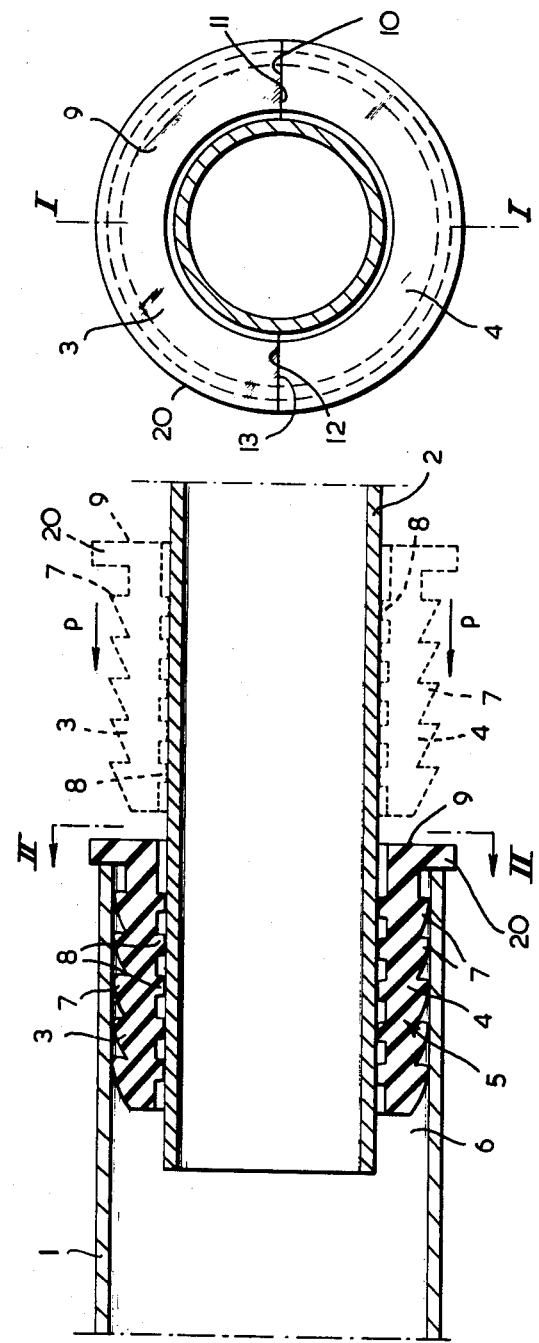

SEALING DEVICE

The present invention relates to a sealing device for sealingly connecting coaxial conduits and the like of a conduit arrangement including a first conduit and a second conduit, wherein the second conduit is disposed a predetermined distance in the first conduit.

There exists the problem of sealingly connecting conduits of conduit arrangements, particularly for subterranean conduit systems at the location where from a main conduit for gas, water, and power etc., a line is branched off to a house; the problem arises when the sealing connection has to be achieved between conduits which are already in position, frequently one being disposed in the other with such an axial overlap so that practically a solid annular or hollow cylindrical sealing member cannot be utilized therewith. Thus, for sealingly connecting such conduits in the aforementioned situations, normally a sealing compound is used to close the annular space between the coaxially arranged conduits. This method of sealing is laborious and is often not effective since leaks can occur as has been frequently experienced.

It is an object of the present invention to provide a sealing device which avoids the detriments of the known sealing systems.

This object and other objects and advantages of the invention will appear more clearly from the following specification in connection with the accompanying drawing, in which:

FIG. 1 is a cross-sectional longitudinal view of two conduits which are sealingly connected by means of a sealing device in accordance with the present invention, with the section being taken along line I—I in FIG. 2; and FIG. 2 is an end view of the arrangement of FIG. 1 in the direction of line II—II in FIG. 1.

The present invention is characterized primarily therein that a sealing device is provided including a longitudinal hollow body member of elastic material. The sealing device further comprises a plurality of first projections arranged circumferentially on and projecting radially from the hollow body member. The outer diameter of the first projections are selected to be greater than the inner diameter of the conduit in which the device will be disposed to effect the sealing connection. The device further comprises a plurality of second projections arranged circumferentially in and projecting radially towards the central axis of the hollow body member. The second projections extend to an imaginary circle having a diameter which is at most equal to the outer diameter of the conduit which is disposed by a predetermined distance within the other conduit. The device is further characterized therein that at least one of the first projections and at least one of the second projections are arranged at least in part in a common radial section of a predetermined axial length.

It has been shown that a device in accordance with the present invention is particularly adapted to be provided with an axial separating gap so that the device can be placed about the inner conduit which is already disposed a predetermined distance within the outer conduit.

In accordance with a preferred embodiment of the invention the sealing device includes a first segment and a second segment to form the hollow body member. The first segment and the second segment having contact surfaces extending in the longitudinal direction of the body member. The contact surfaces of one segment are adapted to sealingly contact the contact surfaces of the other segment belonging therewith. Such an embodiment is preferred for reasons of manufacturing techniques and may be preferred to having only a single longitudinal separating gap in a split in the longitudinal direction to permit spreading of the sealing device. The contact surfaces do not detrimentally affect the properties of the sealing device in accordance with the present invention.

In accordance with another preferred embodiment of the invention, the first projections are triangular in cross section with the free apex of a triangle pointing away from the hollow body member. Consequently, the second projections belonging therewith are arranged at least in part in a radial section which includes the free apex of a triangular first projection.

In accordance with another preferred embodiment, the body member of the sealing device includes a flange at one end; the flange extends radially outwardly and provides a surface adapted to be contacted by that end of the outer conduit in which the second conduit is disposed.

Referring now particularly to the drawing, illustrations in FIG. 1 there is shown a first or outer conduit or duct 1 in which there is coaxially arranged a second or inner conduit or duct 2. This arrangement is typical of most of the pairs of conduits which are to be sealingly connected. The sealing connection of conduits which are arranged in this manner can be carried out with a sealing device, generally designated by the numeral 5, as will be described next. The sealing device 5 comprises two segments 3 and 4, respectively. The sealing device 5 can be produced from a hard elastic rubber or similar elastomeric material. The segments 3 and 4 of the device 5 particularly are placed to surround the conduit 2 at the location ahead of conduit 1, as indicated in dash outline in FIG. 1. Subsequently the device 5 is moved in the direction indicated by arrows P into the annular space 6 formed between conduit 1 and conduit 2. The segments 3 and 4 of the device 5 are provided with a plurality of first projections arranged circumferentially on the outer diameter of the device, i. e. on the outer diameter of the longitudinal hollow body member of the device 5. These first projections are preferably of a cross-sectional outline having the shape of a triangle, preferably a right angle triangle. These projections are designated by the numeral 7. A plurality of second projections is arranged circumferentially in the longitudinal hollow body member. These second projections, which are designated by the numeral 8, can be trapeze-like in cross section. After mounting of the device, it is driven into the annular space 6, for example by tapping with a hammer onto the flange 9. The flange 9 extends radially outwardly and presents a surface adapted to be contacted by the end of conduit 1 in which the conduit 2 is disposed. Assembly of the sealing device between conduits 1 and 2 in this manner causes the projections 7 to be somewhat compressed by conduit 1; this, in turn, causes the projections 8 to be tightly pressed onto the outer diameter of conduit 2 to sealingly and effectively engage the outer diameter of conduit 2. A sealing device 5 made of rubber will have the advantage that contact surfaces, namely contact surfaces 10 and 12 of segment 4 and contact surfaces 11 and 13 of segment 3, are now sealingly brought together. The arrangement is now practically gas-tight in the presence of occurring pressures. It will remain effectively in position due to the constraint imposed on the elastomeric material, i. e. rubber.

As required, the surfaces of the conduits and of the sealing device belonging therewith, prior to assembly, can be wetted with water or another similar suitable material to reduce friction, so that the assembly of the arrangement will be carried out more efficiently.

The present invention is, of course, in no way restricted to the specific disclosure of the specification and drawing, but also encompasses any modifications within the scope of the appended claims.

What I claim is:

1. A cylindrical sealing device which seals in an excellent manner though easy to mount and remaining reliably in place without extra fixation means being provided for sealingly connecting coaxial conduits and the like of a conduit arrangement including a first conduit and a second conduit sealed mutually in situ, wherein said second conduit is disposed a predetermined distance coaxially in said first conducit to provide between them an annular space adapted to receive said sealing device radially between the first and second conduits having different diameters, said sealing device comprising in combination:

a longitudinal hollow body member of elastic material uncompressible per se and including two separate parts together being cylindrical in complementary relationship to each other with a central axis therein;

a plurality of first unflexible projections only compressibly arranged circumferentially on and projecting radially outwardly from said hollow body member, with the outer diameter of said first projections being selected to be greater than the inner diameter of said first conduit to effect said sealing connection; and a plurality of second unflexible projections only compressibly arranged circumferentially in and projecting radially inwardly towards the central axis of said hollow body member, said second projections projecting to an imaginary circle having a diameter which is at most equal to the outer diameter of said second conduit, with at least one of said first projections and at least one of said second projections being arranged when pressed together to transmit compression forces at least in part in a common radial section of a predetermined axial length.

2. A sealing device in combination according to claim 1, wherein the wall of said body member is split in the longitudinal direction to permit spreading of said sealing device.

3. A sealing device in combination according to claim 1, wherein said sealing device includes a first segment and a second segment to form said hollow body member, said first segment and said second segment having contact surfaces extending in the longitudinal direction of said body member, said contact surfaces of one segment being adapted to sealingly contact the contact surfaces of the other segment belonging therewith.

4. A sealing device in combination according to claim 3, wherein said first projections are triangular in cross section, the free apex of a triangle pointing away from said hollow body member.

5. A sealing device in combination according to claim 4, wherein a second projection is arranged at least in part in a radial section which includes the free apex of a triangular first projection belonging therewith.

6. A sealing device in combination according to claim 5, wherein said body member includes a flange at one end thereof, said flange extending radially outwardly and providing a surface contacted by that end of said first conduit in which said second conduit is disposed.

* * * * *

UNITED STATES PATENT AND TRADEMARK OFFICE
CERTIFICATE OF CORRECTION

PATENT NO. : 4,293,138
DATED : October 6, 1981
INVENTOR(S) : Klaus Bertil Meijer Swantee It is certified that error appears in the above—identified patent and that said Letters Patent is hereby corrected as shown below:

On the Title Page, Item [75] should read:

--- [75] Inventor: Klaus B. Meijer Swantee, Ht. Lemmes, Netherlands ---.

Signed and Sealed this

*First* Day of *December 1981*

[SEAL]

*Attest:*

GERALD J. MOSSINGHOFF

*Attesting Officer*     *Commissioner of Patents and Trademarks*